(12) United States Patent
Kim

(10) Patent No.: US 12,447,772 B1
(45) Date of Patent: Oct. 21, 2025

(54) NUT PICKUP AND FASTENING DEVICE FOR AUTOMATIC TIRE MOUNTING

(71) Applicant: TOSYS Co., Ltd., Incheon (KR)

(72) Inventor: Sang Pill Kim, Incheon (KR)

(73) Assignee: TOSYS Co., Ltd., Incheon (KR)

( * ) Notice: Subject to any disclaimer, the term of this patent is extended or adjusted under 35 U.S.C. 154(b) by 0 days.

(21) Appl. No.: 19/073,459

(22) Filed: Mar. 7, 2025

(30) Foreign Application Priority Data

Apr. 18, 2024 (KR) ........................ 10-2024-0052009

(51) Int. Cl.
*B60B 29/00* (2006.01)
*B23P 19/06* (2006.01)
*B25J 15/00* (2006.01)
*B60B 30/02* (2006.01)

(52) U.S. Cl.
CPC .......... *B60B 29/006* (2013.01); *B23P 19/065* (2013.01); *B25J 15/0019* (2013.01); *B60B 30/02* (2013.01); *B60B 2340/18* (2013.01); *B60B 2340/34* (2013.01); *Y10T 29/53448* (2015.01)

(58) Field of Classification Search
CPC ... B60B 29/006; B60B 30/02; B60B 2340/18; B60B 2340/34; B23P 19/065; B25J 15/0019; Y10T 29/53448
See application file for complete search history.

(56) References Cited

U.S. PATENT DOCUMENTS

| 3,491,837 A | * | 1/1970 | Ritz | ...................... B60B 29/006 173/183 |
| 2006/0288577 A1 | * | 12/2006 | Bormuth | ............... B23P 19/069 29/894 |
| 2011/0048649 A1 | * | 3/2011 | Komatsu | ................ B62D 65/12 157/1.35 |
| 2013/0299510 A1 | * | 11/2013 | Sugimoto | ............. B23P 19/003 221/268 |
| 2021/0114408 A1 | * | 4/2021 | Darolfi | .................... B60B 29/00 |

FOREIGN PATENT DOCUMENTS

| CN | 113212064 A | * | 8/2021 | .......... B60B 29/006 |
| JP | H05246203 A | * | 9/1993 | |
| JP | H07186602 A | * | 7/1995 | |
| JP | 2009179144 A | * | 8/2009 | |
| KR | 100820426 B1 | * | 4/2008 | ............. B60B 31/00 |
| KR | 20220153413 A | * | 11/2022 | ............. B60B 29/001 |
| WO | WO-2019036793 A1 | * | 2/2019 | ............. B23P 19/10 |

* cited by examiner

*Primary Examiner* — Jermie E Cozart
(74) *Attorney, Agent, or Firm* — The PL Law Group, PLLC

(57) ABSTRACT

A nut pickup and fastening device for automatic tire mounting includes a nut setting unit that arranges a plurality of nuts to align with the bolt arrangement of the wheel disk of a vehicle body, and a pickup fastener coupled to the tip of a robot arm. The pickup fastener may include a tool frame unit, a plurality of nut runners provided on the tool frame unit corresponding to the set nuts and configured to provide torque for nut fastening, and a plurality of holding sockets coupled to the tip of each nut runner, configured to pick up and hold the nuts from the nut setting unit.

10 Claims, 19 Drawing Sheets

NUT PICKUP AND FASTENING DEVICE FOR AUTOMATIC TIRE MOUNTING

CROSS REFERENCE TO RELATED APPLICATIONS AND CLAIM OF PRIORITY

This application claims the benefit under 35 USC § 119(a) of Korean Patent Application No. 10-2024-0052009 filed on Apr. 18, 2024 in the Korean Intellectual Property Office, the entire disclosure of which is incorporated herein by reference for all purposes.

BACKGROUND

1. Technical Field

The present invention relates to a nut pickup and fastening device for tire mounting.

More specifically, the present invention relates to a nut pickup and fastening device that enables the entire process of fastening nuts for tire mounting to the bolts of a wheel disk to be performed through an automated method using a single robot arm.

2. Background Art

In general, vehicle production includes numerous assembly processes. Among them, the tire mounting process involves mounting a tire onto the wheel disk of a vehicle body.

Conventionally, tire mounting has relied on manual labor, which has led to issues such as increased worker fatigue, delays in production time, rising labor costs, and decreased productivity. Additionally, there have been cases of fastening defects.

To address these issues, efforts have been made to introduce an automated method using a robot arm to mount tires.

However, due to a lack of technology for automatically setting and picking up nuts in a state ready for fastening, some parts of the process still require manual labor, or additional robots must be used separately to set nuts onto the tire, making the process more complex.

As a result, there are limitations in improving productivity through a fully automated method.

SUMMARY

One or more embodiments of the present invention has been proposed to solve one or more of the problems of the related art described above, and an aspect of the present invention is to provide a nut pickup and fastening device for automatic tire mounting, in which the entire process from nut setting to fastening the nuts onto the bolts of the wheel disk is implemented through a fully automated method using a single robot arm. Additionally, it allows for quick responses to defects or accidents that may occur during the mounting process.

According to an embodiment of the present invention, a nut pickup and fastening device for automatic tire mounting includes: a nut setting unit that arranges a plurality of nuts to align with the bolt arrangement of the wheel disk of a vehicle body; and a pickup fastener coupled to the tip of a robot arm, wherein the pickup fastener comprises: a tool frame unit, a plurality of nut runners provided on the tool frame unit corresponding to the set nuts and configured to provide torque for nut fastening, and a plurality of holding sockets coupled to the tip of each nut runner, configured to pick up and hold the nuts from the nut setting unit.

The entire process, from nut setting to pickup, holding, and fastening, can be performed solely by the movement of a single robot arm. This minimizes loss time due to full automation, thereby significantly improving productivity in the tire mounting process.

Additionally, if a fastening defect occurs, the nuts are automatically retrieved, allowing the subsequent process to proceed quickly. In case of emergencies, the system can move out of the collision range with the vehicle body, effectively preventing accidents that may occur during the mounting process.

DETAILED DESCRIPTION

Figure 1:
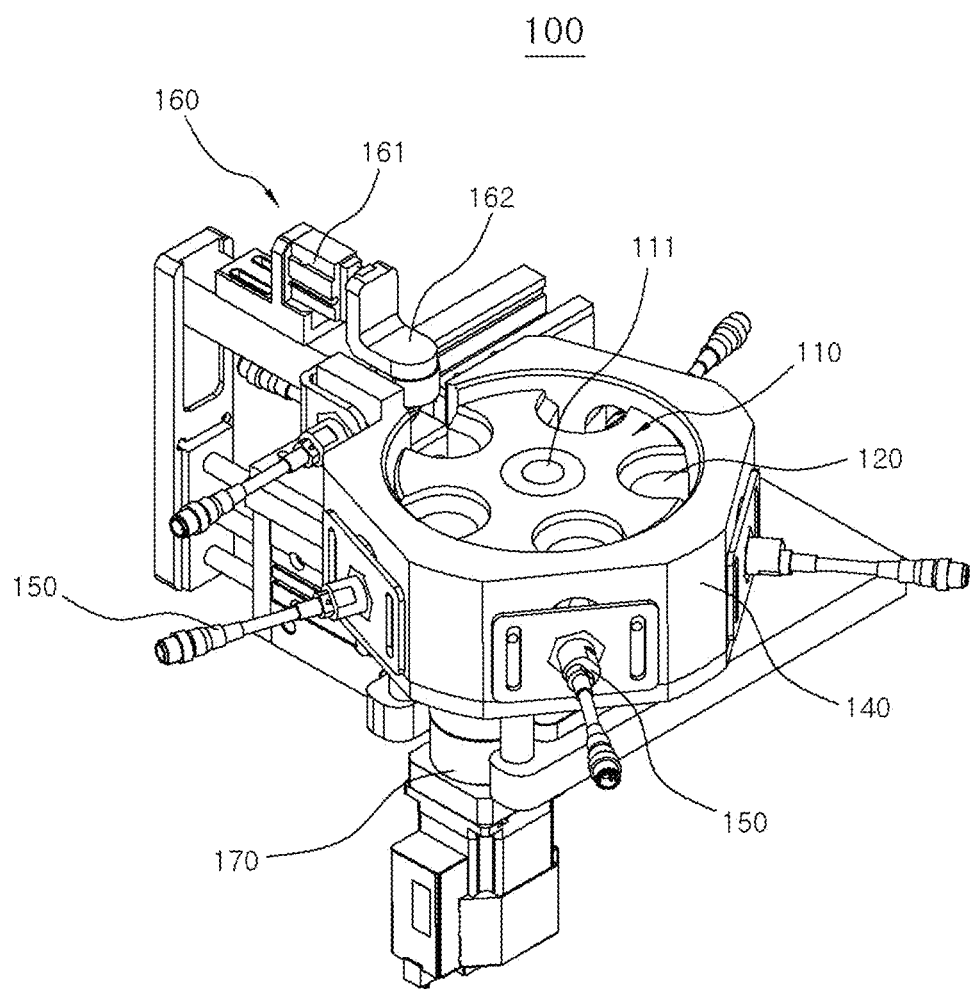
FIG. 1 is a perspective view illustrating a nut setting unit according to an embodiment of the present invention.

Hereinafter, an exemplary embodiments of the present invention will be described in detail with reference to the accompanying drawings.

The shape, size, number, and spacing of elements in the attached drawings may be reduced or exaggerated for clarity, and unless otherwise specified, the invention is not limited to the aspects depicted in the drawings.

Additionally, directional terms such as front, rear, left, right, top, and bottom used in the drawings and descriptions are based on the perspective in which the drawings are viewed. Therefore, these terms may vary depending on the observer's viewpoint.

FIGS. 1 to 10 illustrate an example of a nut pickup and fastening device for automatic tire mounting according to an embodiment of the present invention.

As illustrated in the figures, the present invention may include a nut setting unit 100, a pickup fastener 300, and a nut recovery unit 500.

Figure 2:
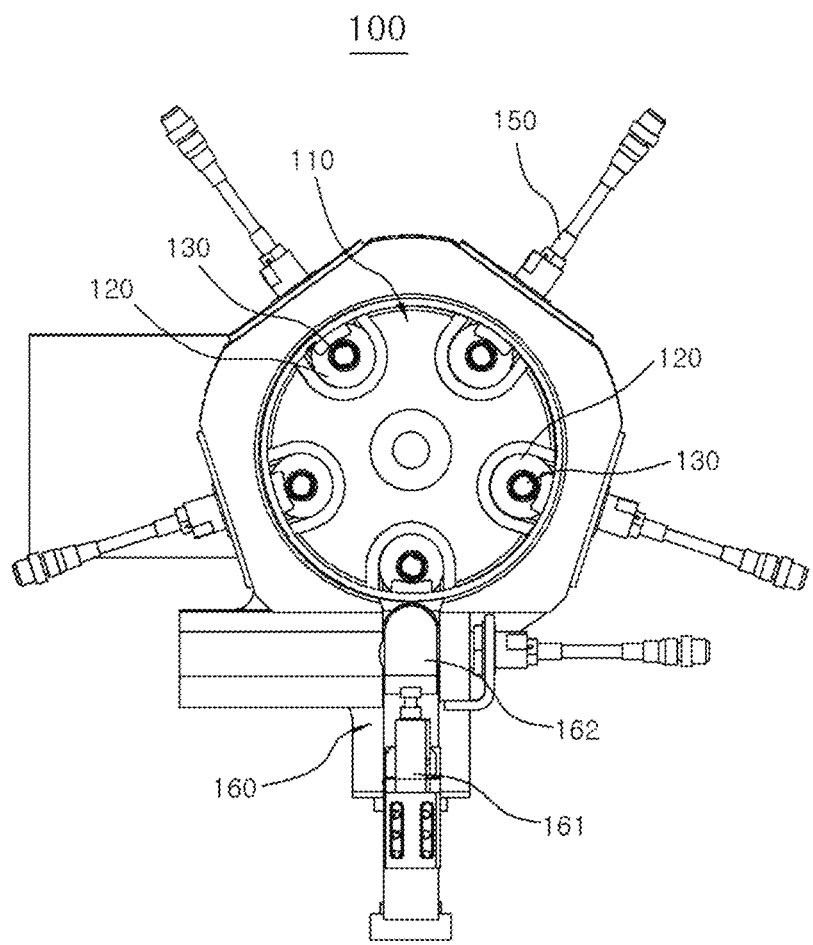
FIG. 2 is a top view illustrating a nut setting unit according to an embodiment of the present invention.
Figure 3:
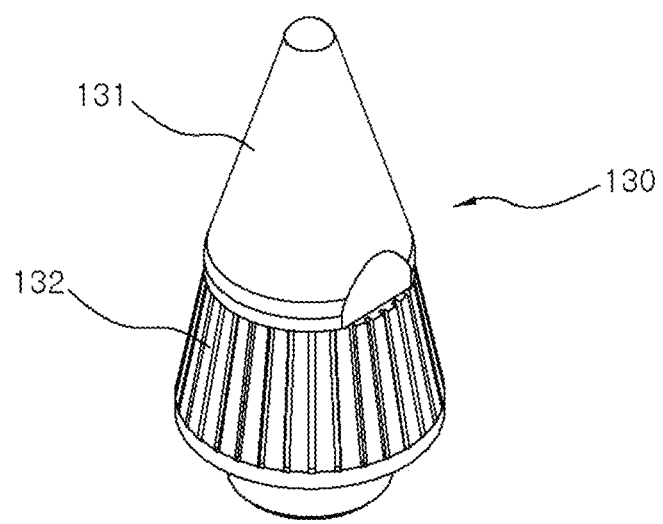
FIG. 3 is a perspective view illustrating a support according to an embodiment of the present invention.

Referring to FIGS. 1 to 3, the nut setting unit 100 is a component that arranges a plurality of nuts N for tire mounting in alignment with the bolt arrangement on the wheel disk of the vehicle body.

In other words, since a plurality of bolts are arranged in a circular pattern around the wheel axis on the wheel disk of the vehicle body, the plurality of nuts N fastened to these bolts are also set by the nut setting unit 100 to be aligned in the same circular pattern as the bolt arrangement.

Here, the number of tire mounting bolts and nuts varies depending on the vehicle type, such as four pairs, five pairs, or six pairs. For convenience, the explanation below uses the most commonly used five-pair configuration as an example.

For example, if five bolts are arranged at 72° intervals along the circumference of the wheel disk, the nut setting unit 100 sets the five nuts N to be aligned in the same circular pattern with 72° intervals.

The nut setting unit 100 may include, for example, a setting die 110, setting holes 120, supports 130, a cover block 140, a pickup detection sensor 150, an insertion unit 160, and a shift driver 170.

The setting die 110 may have a disc-shaped form, and a plurality of setting holes 120 may be formed in the setting die 110.

The plurality of setting holes 120 may be radially arranged at uniform angular intervals along the circumference of the outer part of the setting die 110.

Each of the plurality of setting holes 120 allows nuts N to be inserted and seated.

The number and spacing of the setting holes 120 can naturally correspond to the number and arrangement of the bolts on the wheel disk.

For example, if the wheel disk to be mounted has a five-bolt arrangement, the setting die 110 may have five setting holes 120 arranged at 72° intervals in a circular pattern.

The setting holes 120 may have a circular shape, and the outer end portion facing the cover block 140, described later, may be open to allow the pickup detection sensor 150, described later, to detect the presence of nuts N.

The setting die 110 may be configured to rotate horizontally. For example, the center of the setting die 110 may be coupled to the shift driver 170, described later, via a rotating shaft 111.

Accordingly, the setting die 110 can rotate horizontally at predetermined angles through the operation of the shift driver 170.

At this time, the rotation angle of the setting die 110 may be the same as the arrangement angle of the setting holes 120. For example, the setting die 110 may rotate by 72° per operation of the shift driver 170.

The support 130 may be provided inside the setting hole 120.

The support 130 supports the nut N inserted into the setting hole 120 so that it stands upright.

Additionally, the support 130 provides a certain frictional force to the nut N to restrict its free rotation in the horizontal direction.

In other words, when a nut N is inserted into the setting hole 120, it is supported in an upright position by the support 130. When picked up by the holding socket 350, as described later, it experiences frictional resistance from the support 130, preventing it from rotating together with the holding socket 350.

The support 130 is designed to fit into the internal threaded portion n1 of the nut N and provide a certain frictional force to the internal thread portion n1 when inserted.

For example, as illustrated in FIG. 3, the support 130 may include a guide head 131 with a conical shape that facilitates insertion into the internal threaded portion n1 of the nut N and a serrated body 132 below the guide head 131 that provides frictional force to the tightly fitted internal thread portion n1.

Here, the frictional force provided by the serrated body 132 to the nut N is set to be smaller than the holding force of the holding socket 350.

Thus, while the nut N is restricted from rotating together with the holding socket 350 during insertion, it can be easily detached vertically from the serrated body 132 during pickup by the holding socket 350.

The cover block 140 may be provided to enclose the side portion of the setting die 110.

The cover block 140 may be provided with a pickup detection sensor 150 at each position facing the plurality of setting holes 120.

The pickup detection sensor 150 detects whether the nuts N set in the setting holes 120 have been properly picked up.

That is, when the nuts N are successfully picked up, the setting holes 120 become empty, whereas if pickup fails, nuts N remain in the setting holes 120. The pickup detection sensor 150 detects whether the nuts N remain after pickup to determine if the process was normal.

The insertion unit 160 is positioned to face one of the plurality of setting holes 120 and inserts the nuts N into the corresponding setting hole 120.

The insertion unit 160 may include, for example, an insertion cylinder 161 and an insertion pusher 162, which advances towards the corresponding setting hole 120 in response to the operation of the insertion cylinder 161 to push and insert the nut N into the setting hole 120.

The shift driver 170 rotates the setting die 110 at predetermined angles so that the plurality of setting holes 120 shift one position at a time along the circumferential direction.

That is, as the plurality of setting holes 120 shift one by one in response to the operation of the shift driver 170, they sequentially face the insertion unit 160, and the insertion unit 160 inserts nuts N into the facing setting holes 120.

The shift driver 170 may be a servo motor located below the setting die 110 and coupled to the center of the setting die 110 via the rotating shaft 111.

At this time, the rotation angle of the setting die 110 by the shift driver 170 is set to match the arrangement angle of the setting holes 120. For example, if five setting holes 120 are arranged at 72° intervals, the shift driver 170 may rotate the setting die 110 by 72° each time.

Referring to FIGS. 4 to 9, the pickup fastener 300 performs the function of picking up the nuts N set by the nut setting unit 100 and fastening them to the bolts of the wheel disk.

The pickup fastener 300 may be mounted at the tip of a robot arm R included in the tire mounting process.

Therefore, the pickup fastener 300 can freely change its position, direction, and angle according to the movement of the robot arm R.

The pickup fastener 300 may include, for example, a tool frame unit, a nut runner 340, a holding socket 350, and a tire grip unit 360.

The tool frame unit is a structure mounted at the tip of the robot arm R and serves as the base for the remaining components of the pickup fastener 300.

The tool frame unit may include, for example, a mounting frame 310 fixed to the tip of the robot arm R and a support frame 320 separate from the mounting frame 310 where the other components are installed.

The support frame 320 is coupled to the mounting frame 310 via an LM guide 331 to be movable in the front-rear direction (X-direction in FIG. 4) and can move in response to the operation of an avoidance cylinder 332.

The operation of the avoidance cylinder 332 can be controlled by a robot detection unit (not shown in the drawings) that detects abnormalities in the robot.

For example, if a failure occurs in the robot arm R itself or in its power supply line during the mounting process, preventing the normal operation of the robot arm R, the robot detection unit controls the avoidance cylinder 332 to move the support frame 320 backward. When the robot arm R returns to normal operation, the support frame 320 is moved forward again to return to its original position.

As the support frame 320 moves forward or backward, all components installed on it also move together in the same manner.

The nut runner 340 is for applying a predetermined torque to the nuts N to fasten them to the bolts of the wheel disk.

Figure 4:
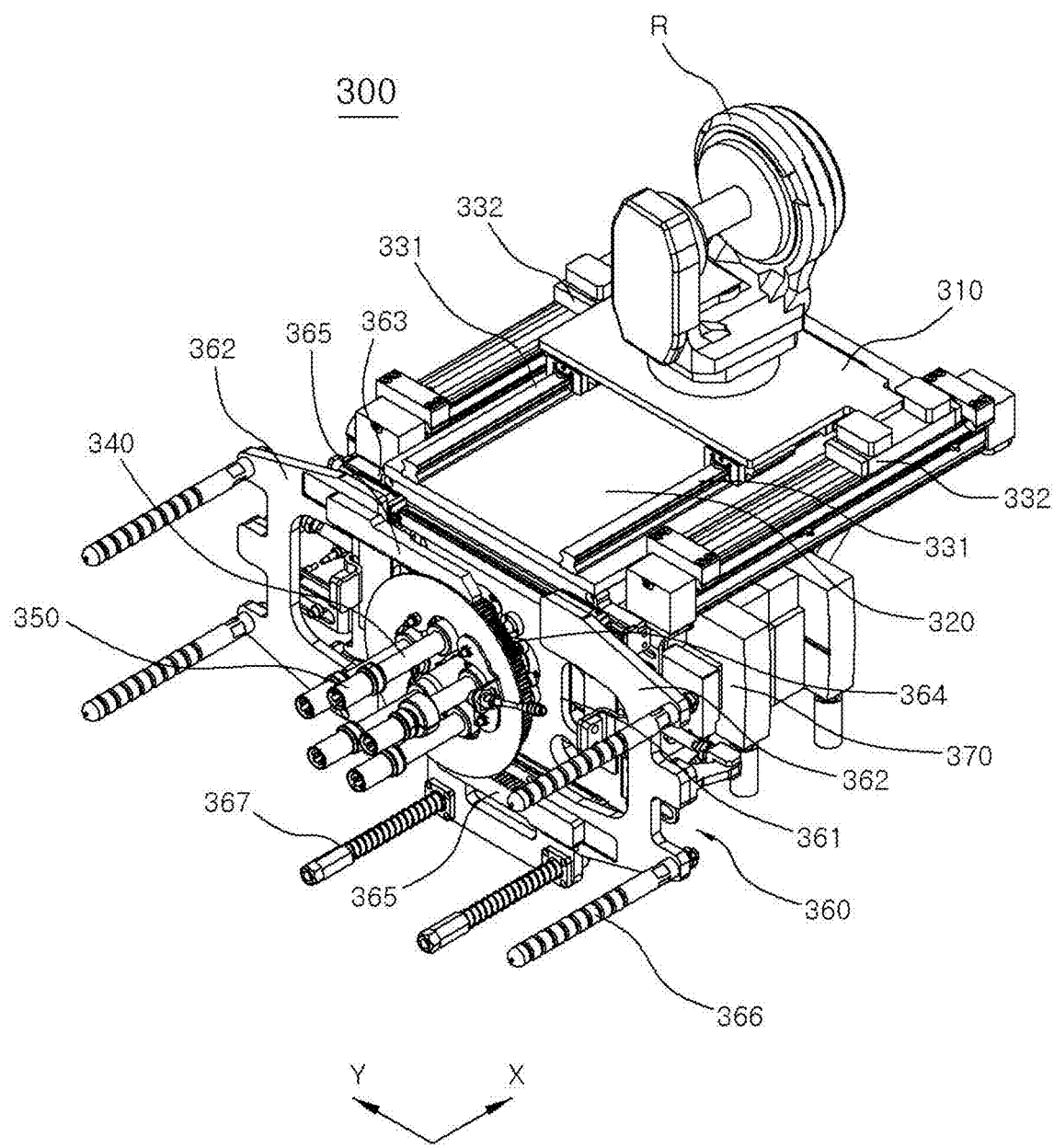
FIG. 4 is a perspective view illustrating a pickup fastener according to an embodiment of the present invention.
Figure 5:
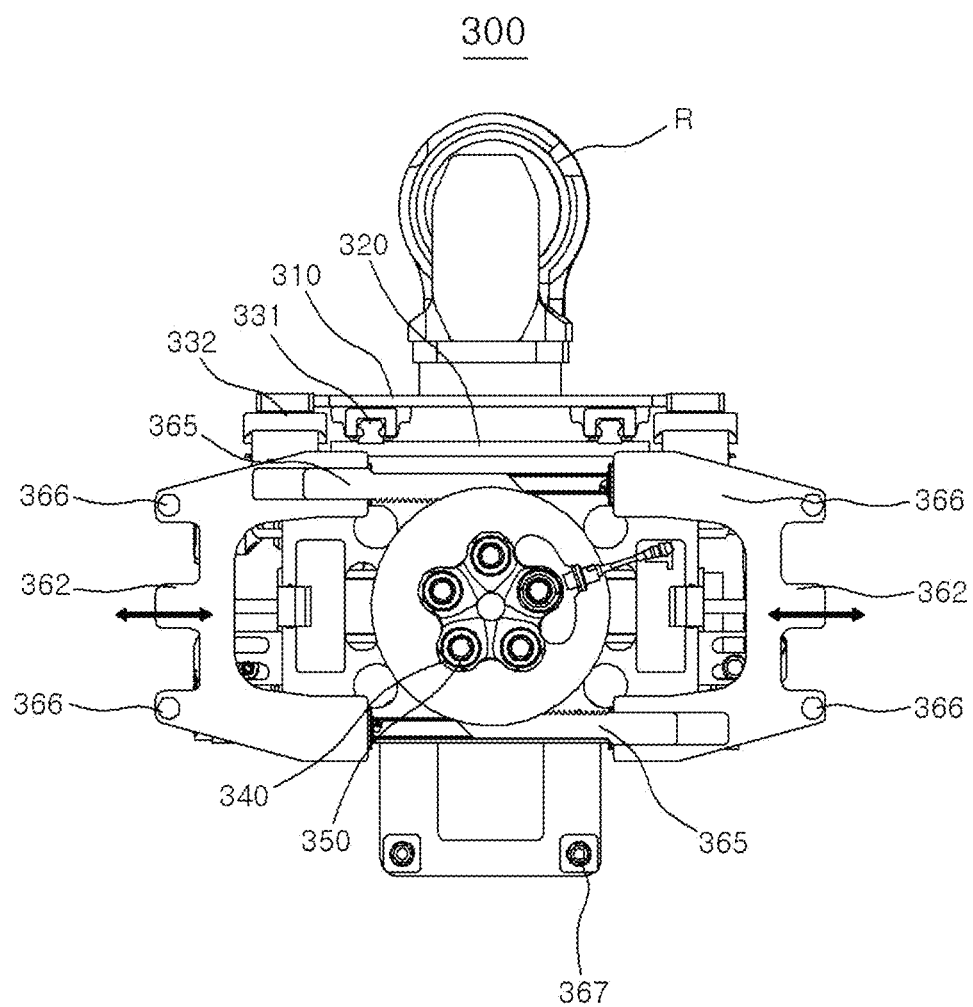
FIG. 5 is a front view illustrating a pickup fastener according to an embodiment of the present invention.
Figure 6:
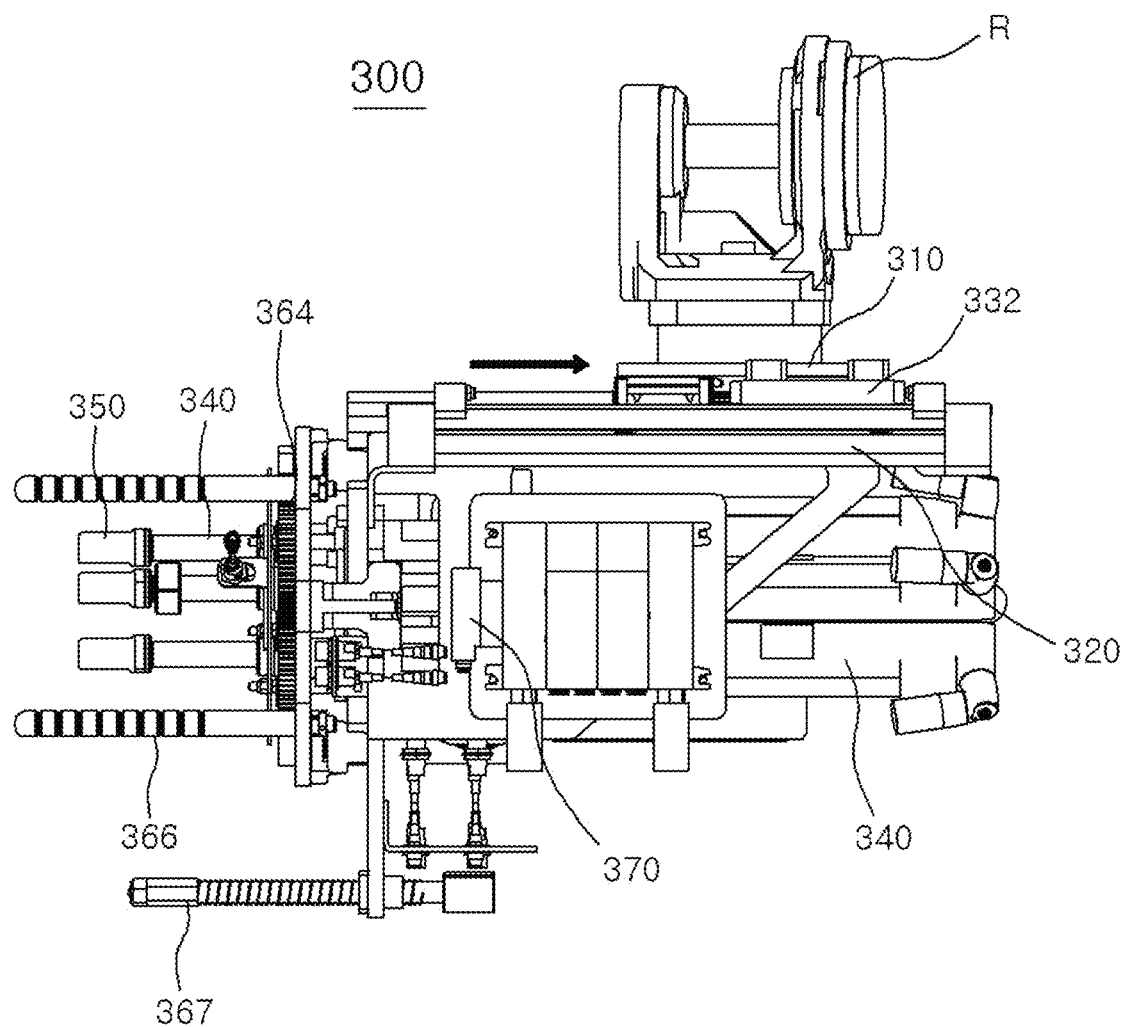
FIG. 6 is a side view illustrating a pickup fastener according to an embodiment of the present invention.

The nut runner 340 may be installed on the support frame 320 so that it extends in the front-rear direction (X-direction in FIG. 4).

A plurality of nut runners 340 may be provided to correspond to the number of setting holes 120 formed in the setting die 110, and they may be arranged in a circular pattern at uniform angular intervals corresponding to the arrangement of the setting holes 120.

That is, as mentioned earlier, if the setting die 110 has five setting holes 120 arranged at 72° intervals, the five nut runners 340 may be arranged in a circular pattern at 72° intervals.

The holding socket 350 is coupled to the tip of each nut runner 340 and can rotate in response to the operation of the nut runner 340.

The holding socket 350 picks up and holds the nuts N set in the setting holes 120.

Figure 7:
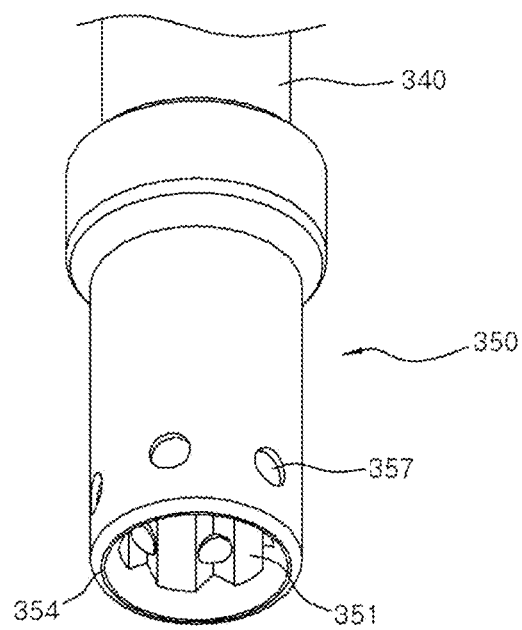
FIG. 7 is a perspective view illustrating a holding socket according to an embodiment of the present invention.
Figure 8:
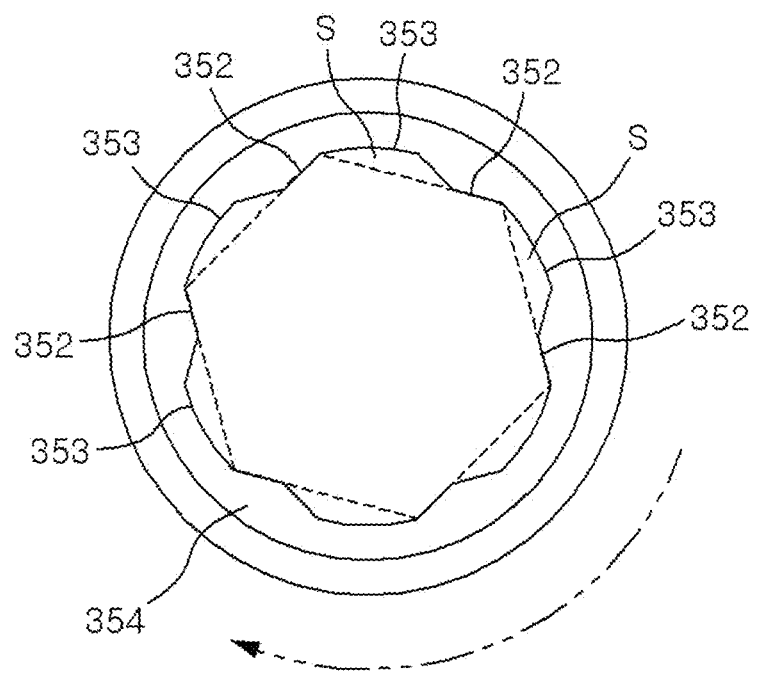
FIG. 8 is a diagram illustrating the structure of the female polygonal portion of the holding socket according to an embodiment of the present invention.
Figure 9:
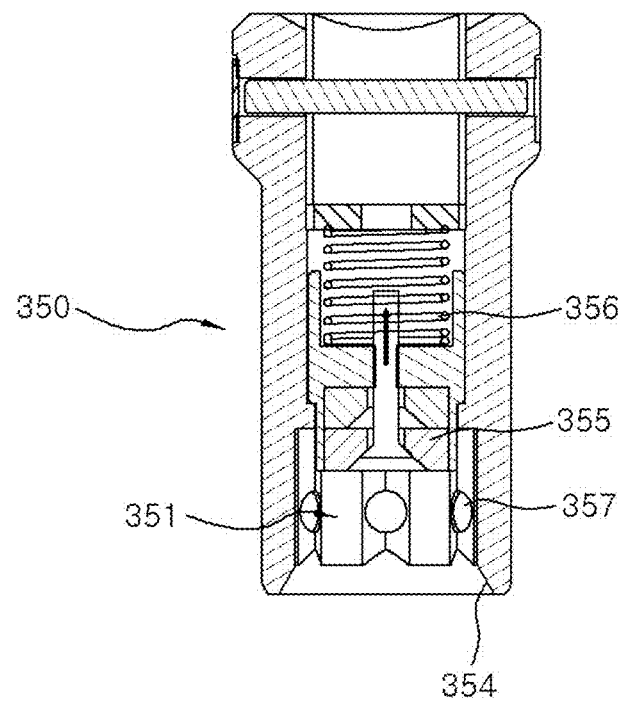
FIG. 9 is a cross-sectional view illustrating the holding socket according to an embodiment of the present invention.

For example, as illustrated in FIGS. 7 to 9, the holding socket 350 may have a female polygonal portion 351 into which the male polygonal portion n2 of the nut N is inserted.

The female polygonal portion 351 is a polygonal groove corresponding to the male polygonal portion n2 of the nut N, and when rotated by the operation of the nut runner 340, it presses against the inserted male polygonal portion n2 to transmit torque to the nut N.

Referring to FIG. 8, the female polygonal portion 351 may have pressing linear sections 352 and non-pressing groove sections 353 on each polygonal face.

Based on the torque application direction, the pressing linear sections 352 are formed at the front part of each face, and the non-pressing groove sections 353 are formed at the rear part following the pressing linear sections 352.

For example, if the female polygonal portion 351 is hexagonal, each of the six faces retains a straight shape in its front portion (based on the torque direction), while the rear portion is recessed into a groove shape.

Accordingly, the pressing linear sections 352 at the front of each face tightly contact the corresponding faces of the male polygonal portion n2, pressing against them when the holding socket 350 rotates to apply torque to the nut N.

Meanwhile, the non-pressing groove sections 353 at the rear create a clearance space(S), allowing a certain degree of free rotation of the male polygonal portion n2 inside the female polygonal portion 351 without interference.

With this configuration, when the holding socket 350 inserts the male polygonal portion n2 of the nut N for pickup, it can be easily inserted regardless of the orientation of the male polygonal portion n2.

In other words, while the positions of the nuts N set in the setting holes 120 are identical, the orientations of their male polygonal portions n2 may vary.

Therefore, if the female polygonal portion 351 had a conventional polygonal shape, the insertion could only be successful when the orientations of the female and male polygonal portions matched perfectly.

However, in the present invention, the holding socket 350 is configured so that when it is rotated slightly left or right during insertion, the clearance space(S) in the non-pressing groove sections 353 allows the male polygonal portion n2 to be easily inserted into the female polygonal portion 351, even if their orientations do not perfectly match.

The lower part of the female polygonal portion 351 may have an inclined introduction slope 354 that guides the insertion of the male polygonal portion n2.

Additionally, the holding socket 350 may have a holding force provider that applies a certain holding force to the male polygonal portion n2 inserted into the female polygonal portion 351, enabling the holding socket 350 to hold the nut N.

As illustrated in FIG. 9, the holding force provider may include an upper magnetic body 355 positioned above the female polygonal portion 351, which holds the male polygonal portion n2 through magnetic attraction.

The upper magnetic body 355 may be elastically supported by a spring 356, allowing its position to adjust based on the height of the inserted male polygonal portion n2.

Figure 16:
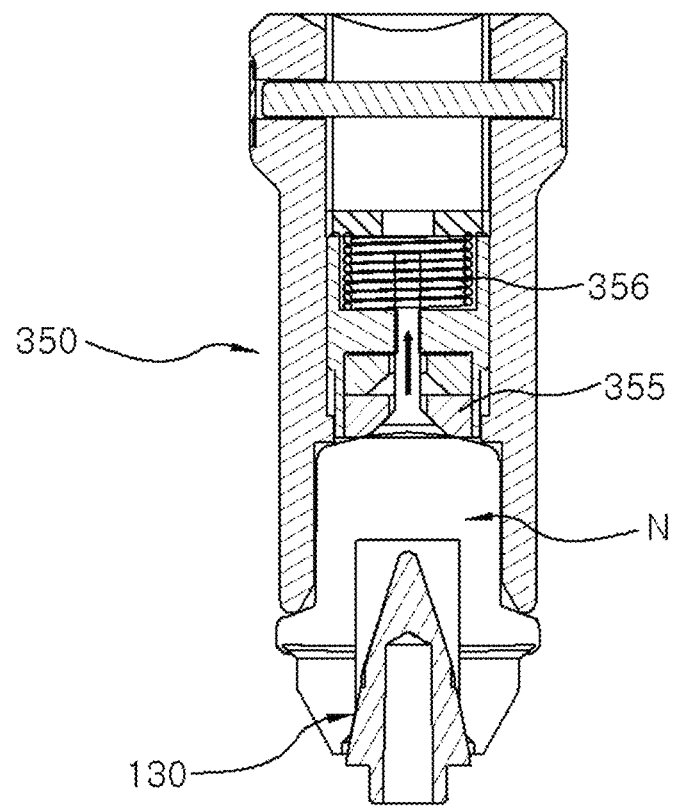
FIG. 16 is a diagram illustrating the state after the male polygonal portion of the nut is completely inserted into the female polygonal portion of the holding socket.

That is, when holding a nut N with a relatively low height, the upper magnetic body 355 remains in a lower position (as shown in FIG. 9) to provide holding force. When holding a nut N with a relatively high height, it moves upward (as shown in FIG. 16) to provide holding force.

For more stable fixation, the holding force provider may further include side magnetic bodies 357.

The side magnetic bodies 357 are positioned on each face of the female polygonal portion 351 to provide additional magnetic holding force to the corresponding sides of the male polygonal portion n2.

The tire grip unit 360 grips the target tire T.

The tire grip unit 360 may include, for example, a fixed plate 361, wing plates 362, wing drive cylinders 363, a synchronization unit, grip arms 366, and a tire detection unit 367.

The fixed plate 361 may be fixedly installed on the support frame 320 of the tool frame unit.

The wing plates 362 and the wing drive cylinders 363 may form a symmetrical pair.

The pair of wing plates 362 may be supported by the fixed plate 361 so that they can move in the left-right direction (Y-direction in FIG. 4).

The pair of wing drive cylinders 363 may be installed on the fixed plate 361 and provide opposing left-right movement forces to the pair of wing plates 362.

The synchronization unit synchronizes the opposing movements of the pair of wing plates 362.

The synchronization unit may include, for example, a pinion gear 364 positioned at the central front part of the pair of wing plates 362 and a pair of rack gears 365 fixed to the wing plates 362 and meshed with both ends of the pinion gear 364.

The grip arms 366 may be provided at the ends of each of the pair of wing plates 362.

The grip arms 366 may be arranged in an upper-lower pair, with their rear ends fixed to the wing plates 362 and extending forward in a rod shape.

As the pair of wing plates 362 move in opposite directions, the left and right grip arm pairs approach or separate from each other, thereby gripping or releasing the tire T.

The tire detection unit 367 detects whether the tire T is positioned between the left and right grip arm pairs and controls the operation of the wing drive cylinders 363 so that the gripping action occurs in response to the detection.

The pickup fastener 300, with the above configuration, may further include a vision sensor unit 370 that contains a vision camera and lighting.

The vision sensor unit 370 provides vision data captured by the vision camera to control the movement of the robot arm R.

For example, when gripping the tire T, the vision sensor unit 370 may capture the wheel frame of the tire T and provide vision data regarding the bolt hole arrangement on the wheel frame.

Additionally, when mounting the tire, the vision sensor unit 370 may capture the wheel disk and provide vision data on the bolt arrangement.

Figure 10:
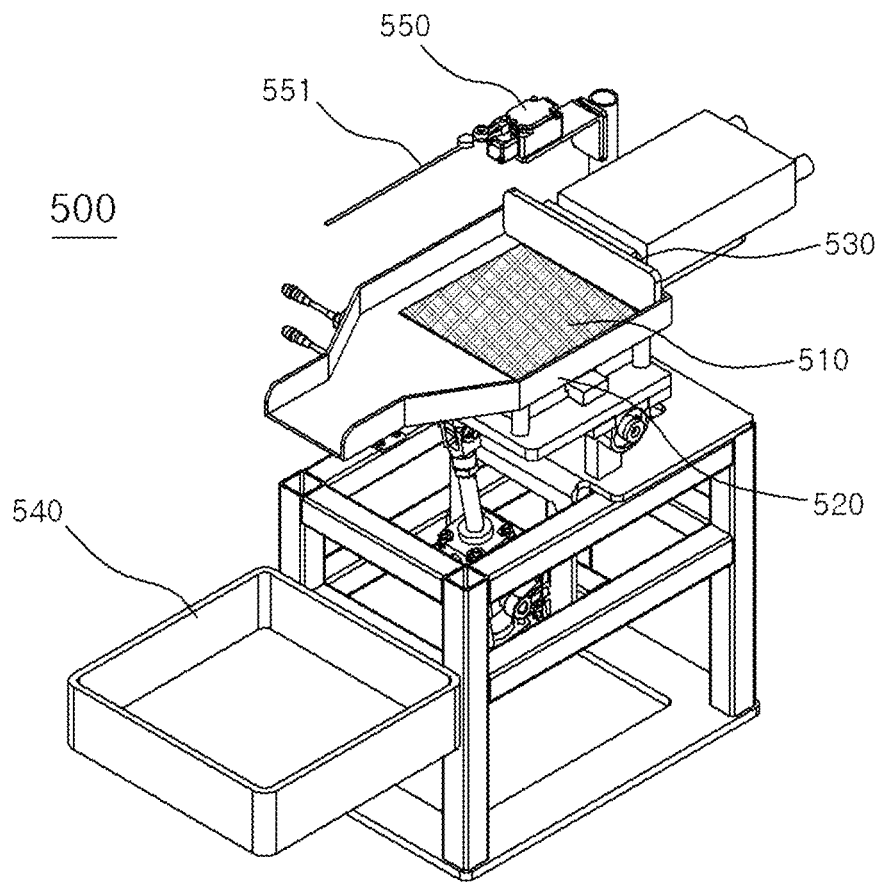
FIG. 10 is a perspective view illustrating a nut recovery unit according to an embodiment of the present invention.

Referring to FIG. 10, the nut recovery unit 500 is a component designed to automatically retrieve nuts N that were not properly fastened during the tire mounting process and remain in the holding sockets 350 of the pickup fastener 300.

That is, when the nuts N are properly fastened to the bolts of the wheel disk and the tire is mounted, a new nut setting and pickup process can proceed continuously.

However, if a nut N is not properly fastened, it remains held in the holding socket 350, preventing the next process from proceeding.

The nut recovery unit 500 is designed to automatically detach and retrieve such remaining nuts due to fastening failure.

The nut recovery unit 500 may include, for example, a detachment force provider 510 and a recovery detector 550.

The detachment force provider 510 applies a detachment force to the nut N held in the holding socket 350 that is relatively greater than the holding force of the holding socket 350. This may be, for example, a magnetic plate.

The magnetic plate 510 may be a magnetic body with a stronger magnetic force than the magnetic bodies 355, 357 of the holding socket 350.

The magnetic plate 510 may be plate-shaped and large enough to face all the holding sockets 350 at once.

The magnetic plate 510 may be installed on a tiltable rotating panel 520 that is inclined forward at a certain angle.

A pushing unit 530 may be provided at the rear of the magnetic plate 510 to push the nuts N attached to the magnetic plate 510 forward.

At the front of the rotating panel 520, a collection bin 540 may be provided to collect nuts N falling from the panel.

The recovery detector 550 detects whether the nuts N have been properly removed from the holding sockets 350.

The recovery detector 550 may include, for example, a detection bar 551 positioned at one side of the rotating panel 520 and installed at a certain height across the horizontal movement path of the holding sockets 350.

The installation height of the detection bar 551 may be set higher than the lower end of a nut N held in the holding socket 350 but lower than the lower end of the holding socket 350 itself.

That is, when the holding socket 350 moves horizontally and passes through the detection bar 551, the holding socket 350 itself can pass without contact, but the nut N held in the holding socket 350 may get caught and make contact due to its height.

Accordingly, if the nut N has been properly recovered, the holding socket 350 will pass through the detection bar 551 without making contact.

On the other hand, if the nut N has not been recovered, the remaining nut N in the holding socket 350 will make contact with the detection bar 551, allowing the system to detect an abnormal recovery failure.

Having described the configuration of the present invention, the following will explain the operation in which five nuts N are set, picked up, and fastened according to the present invention, with reference to FIGS. 11 to 23.

Before explaining the operation, a brief description of the structure of the nut N is provided.

Figure 11:
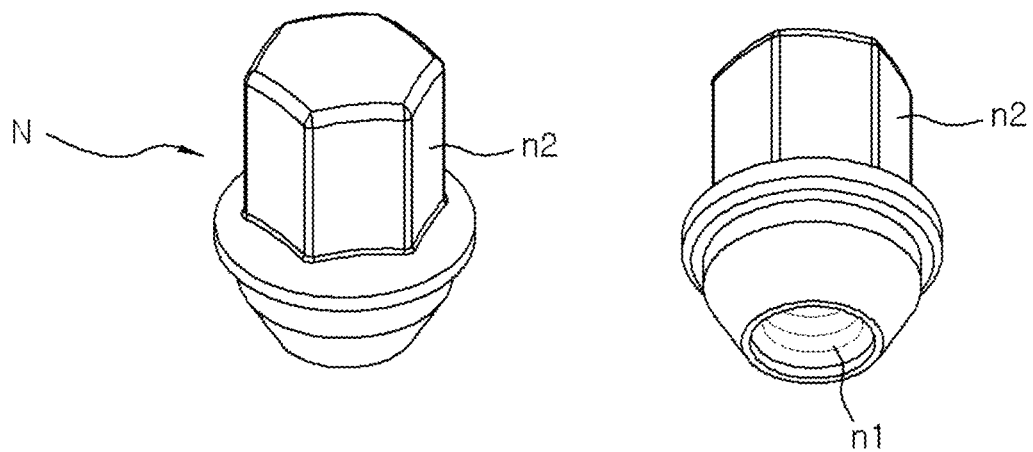
FIG. 11 is a diagram illustrating a nut for tire mounting.

As illustrated in FIG. 11, the nut N has an internal threaded portion n1 on its lower inner side, which is fastened to the externally threaded portion of a bolt. On the upper outer side, it has a male polygonal portion n2 that is inserted into the female polygonal portion 351 of the holding socket 350 to receive torque.

Generally, the nut N comes in two types depending on the material of the tire's wheel frame: one with a relatively lower male polygonal portion n2 and one with a higher male polygonal portion n2.

Now, the operation of the present invention will be described.

First, the nut N is supplied to the insertion unit 160 of the nut setting unit 100 through a nut supplier (not shown).

At this time, the nut supplier may include a bowl feeder or a linear feeder, which transport the nut N through vibration. Such configurations for supplying nuts are well-known technologies.

Figure 12:
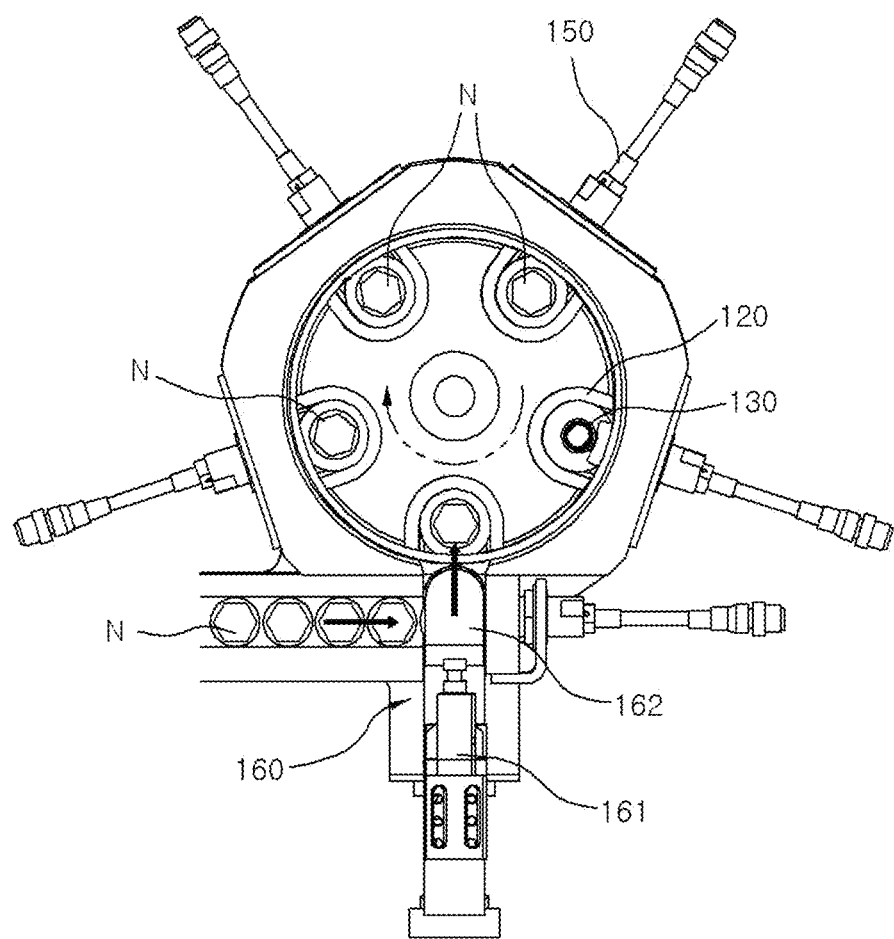
FIG. 12 is a diagram illustrating the nut being set in the nut setting unit.

As illustrated in FIG. 12, when the nut N is supplied, the insertion unit 160 pushes the nut N into the first setting hole 120 among the five setting holes 120.

Then, the inserted nut N is set in place as its internal threaded portion n1 is fitted and supported by the support 130 inside the first setting hole 120.

Once the nut N is inserted and set in the first setting hole 120, the setting die 110 rotates 72° horizontally by the operation of the shift driver 170, shifting all five setting holes 120 by one position.

As a result, the second setting hole 120 comes into position facing the insertion unit 160, and the insertion unit 160 pushes another nut N into it. In the same manner, the second setting hole 120 is also set with a nut N.

This process of shifting the setting die 110 and inserting and setting the nut N continues until all five nuts N are arranged in a circular pattern at 72° intervals, completing the setting process.

Figure 13:
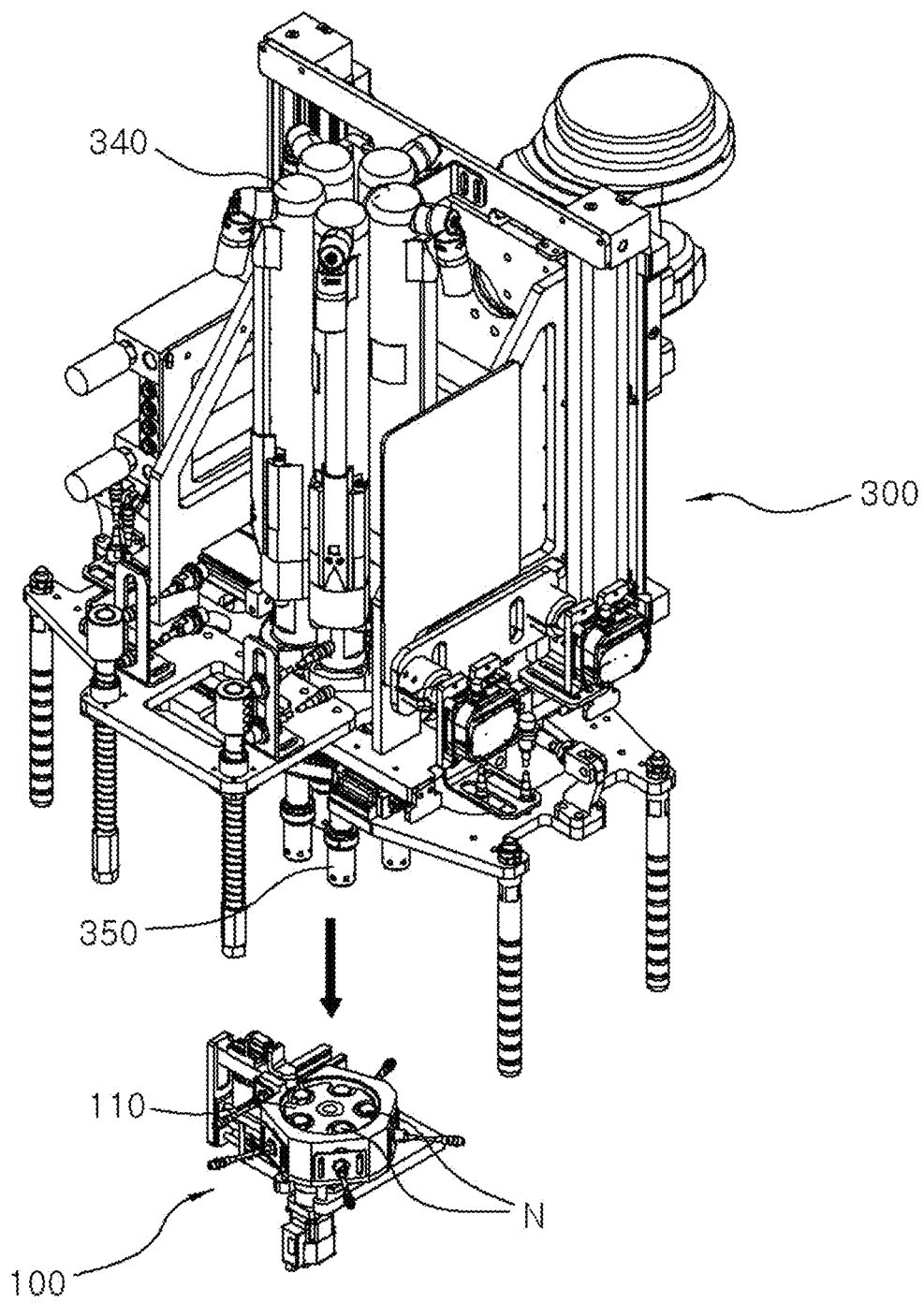
FIG. 13 is a diagram illustrating the pickup fastener descending onto the nut setting unit for nut pickup.

Once the nut N setting is completed, the pickup fastener 300 moves above the setting die 110, as illustrated in FIG. 13, following the movement of the robot arm R.

Then, the five holding sockets 350 descend toward the five setting holes 120 in a position aligned with them, and each holding socket 350 enters its corresponding setting hole 120.

The male polygonal portion n2 of the nut N is then inserted into the female polygonal portion 351 of the holding socket 350, and the magnetic bodies 355, 357 apply a magnetic force to hold the nut N.

Figure 14:
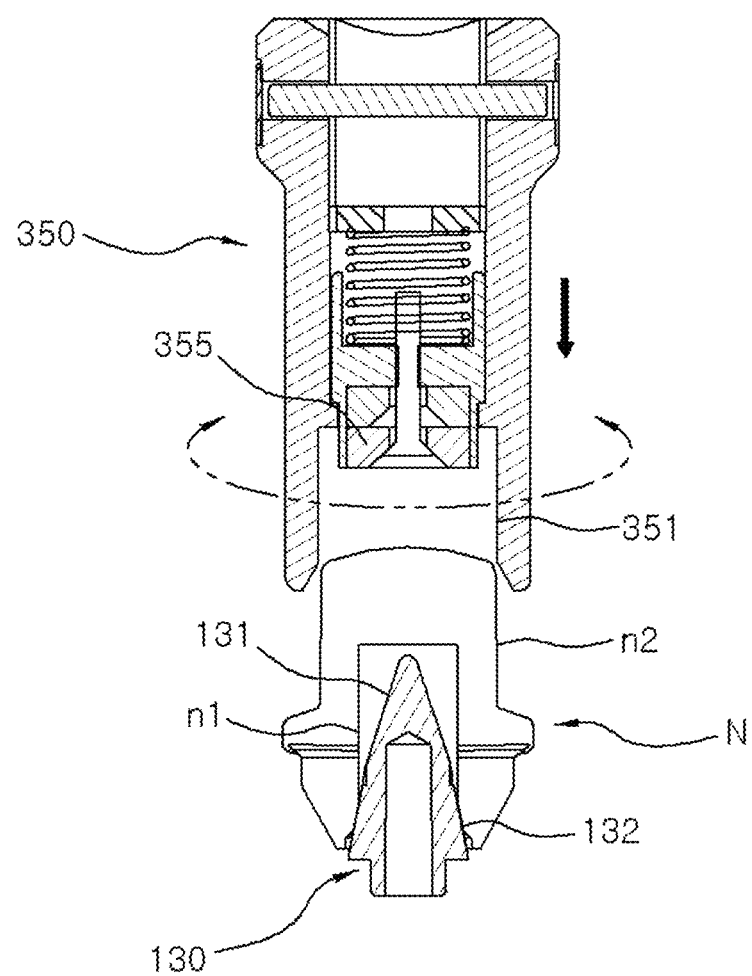
FIG. 14 is a diagram illustrating the state just before the male polygonal portion of the nut is inserted into the female polygonal portion of the holding socket.

During the insertion process, as illustrated in FIG. 14, the holding socket 350 rotates left and right at a preset rpm by the operation of the nut runner 340.

At this time, the nut N remains supported by the support 130 and experiences friction, preventing it from rotating along with the holding socket 350.

Figure 15:
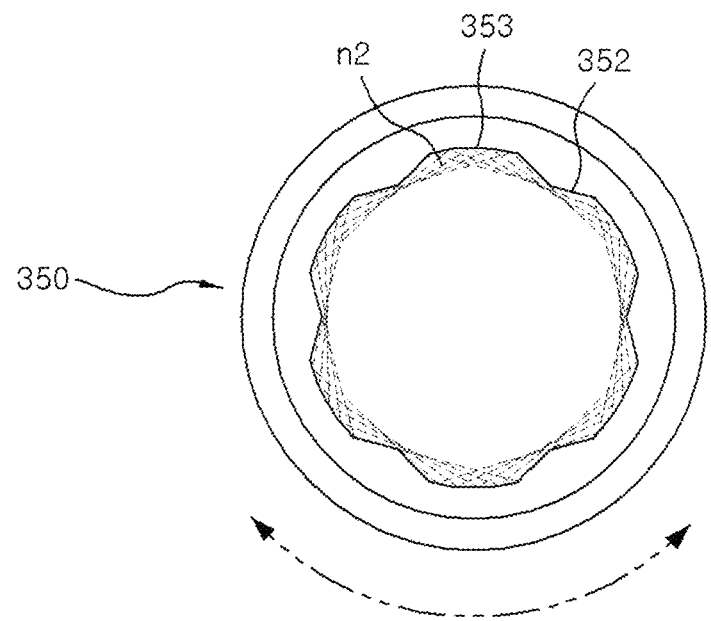
FIG. 15 is a diagram illustrating the clearance space of the female polygonal portion and various insertion directions of the male polygonal portion.

Therefore, as illustrated in FIG. 15, the nut N can be easily inserted into the female polygonal portion 351 of the holding socket 350 regardless of the orientation of the male polygonal portion n2, due to the non-pressing groove section 353 providing clearance.

As illustrated in FIG. 16, when the male polygonal portion n2 is fully inserted (especially in the case of a relatively high type), the upper magnetic body 355 moves upward by compressing the spring 356 to provide holding force.

Once all five holding sockets 350 have securely held their respective nuts N, the pickup fastener 300 moves upward, following the movement of the robot arm R.

Figure 17:
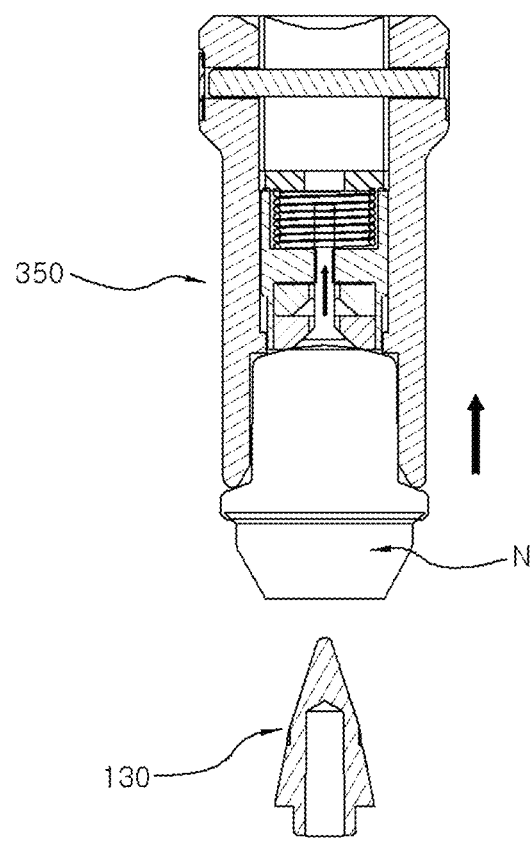
FIG. 17 is a diagram illustrating the state where the holding socket holds the nut and completes the pickup.

As a result, as illustrated in FIG. 17, the holding sockets 350 move away from the setting die 110, completing the nut N pickup process.

During this pickup process, the pickup detection sensor 150 detects whether any nuts N remain in the setting holes 120. If an abnormality is detected, the robot arm R can be controlled to repeat the pickup process.

Once the nut N pickup process is complete, the pickup fastener 300 moves to the tire supply line (not shown), following the movement of the robot arm R.

Figure 18:
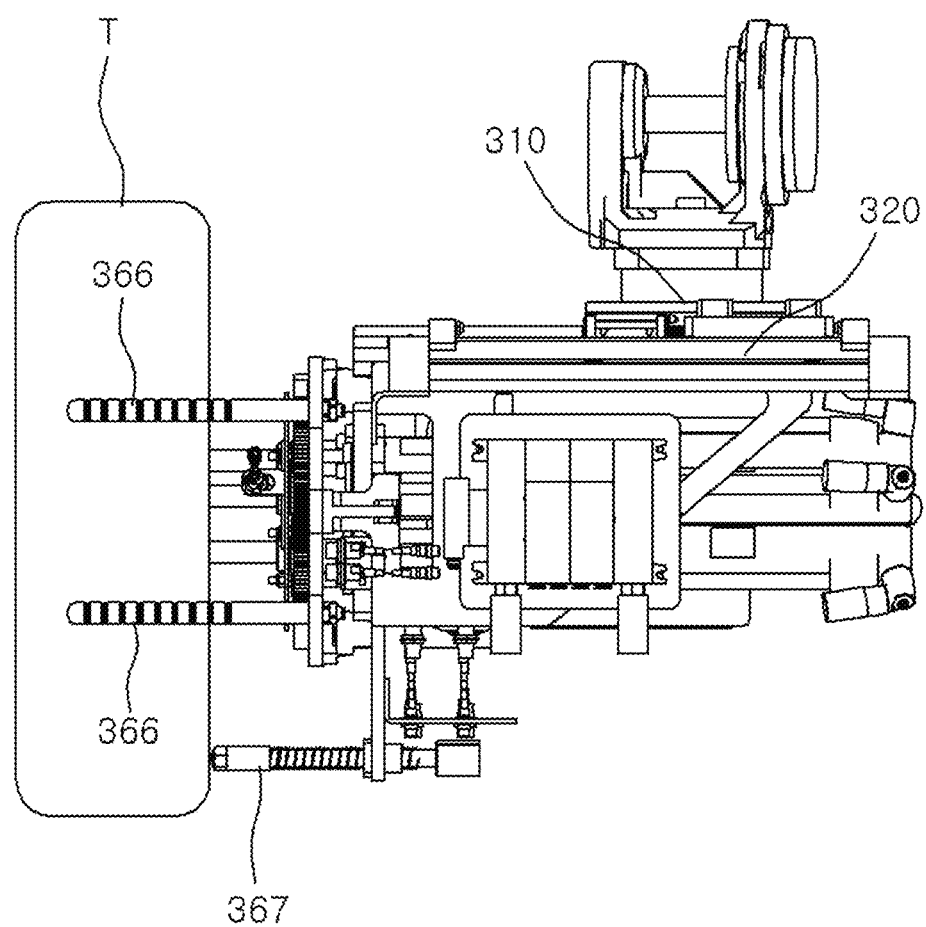
FIG. 18 is a diagram illustrating the pickup fastener gripping the tire.

The pickup fastener 300 then descends toward the supplied tire T from above and activates the tire grip unit 360 to grip the tire T, as illustrated in FIG. 18.

Next, the pickup fastener 300 moves to the wheel disk of the vehicle body, presses the gripped tire T against the wheel disk, and operates the nut runners 340 to fasten the nuts N to the bolts of the wheel disk with a preset torque, thereby completing the tire mounting process.

Meanwhile, during the tire fastening process, the robot arm R itself or its power supply line may experience a failure. Since the vehicle body continues to move along the production line, a collision with the vehicle body may occur.

In the present invention, if an abnormality occurs in the robot arm R, the support frame 320 is controlled to move backward by the operation of the wing drive cylinder 363.

Figure 19:
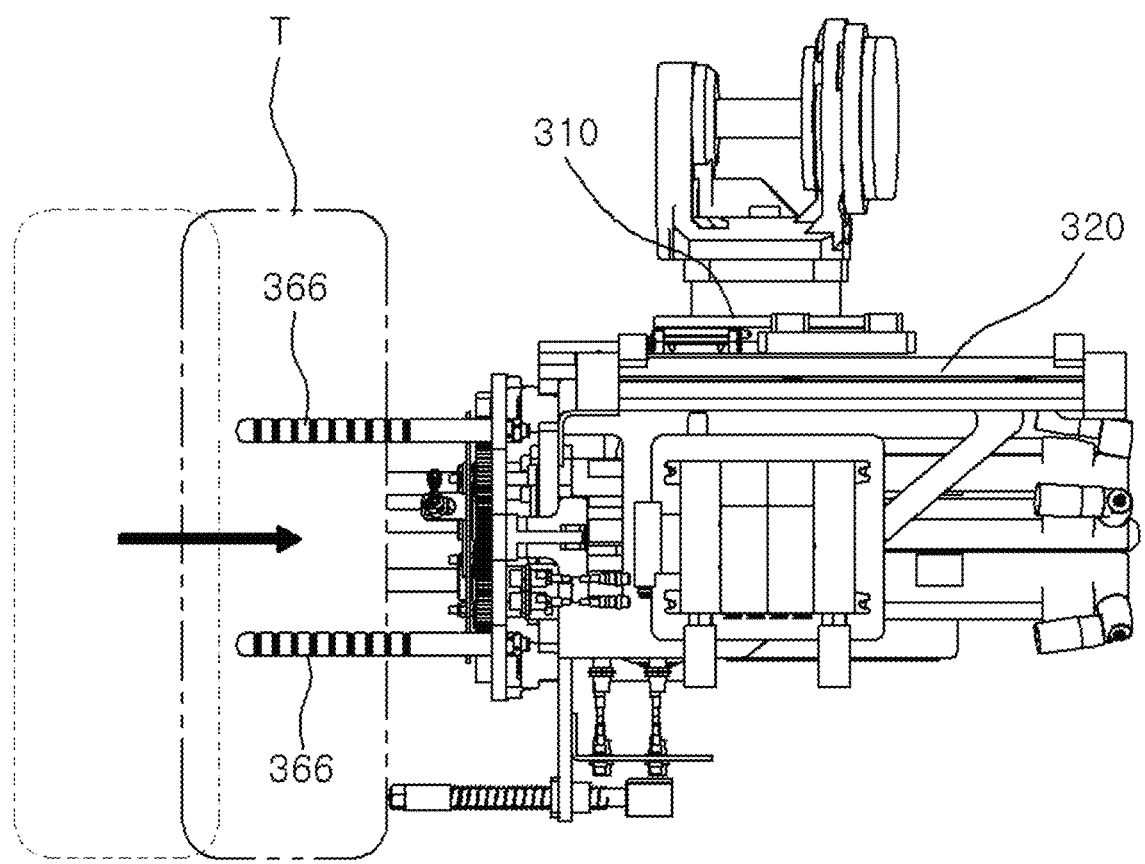
FIG. 19 is a diagram illustrating the state where the support frame moves backward relative to the mounting frame, allowing the pickup fastener to avoid a collision.

As illustrated in FIG. 19, this allows the pickup fastener 300 to move out of the collision range, effectively preventing a collision with the vehicle body.

Additionally, after the tire mounting process, some nuts N may remain in the holding sockets 350 due to fastening failure.

Figure 20:
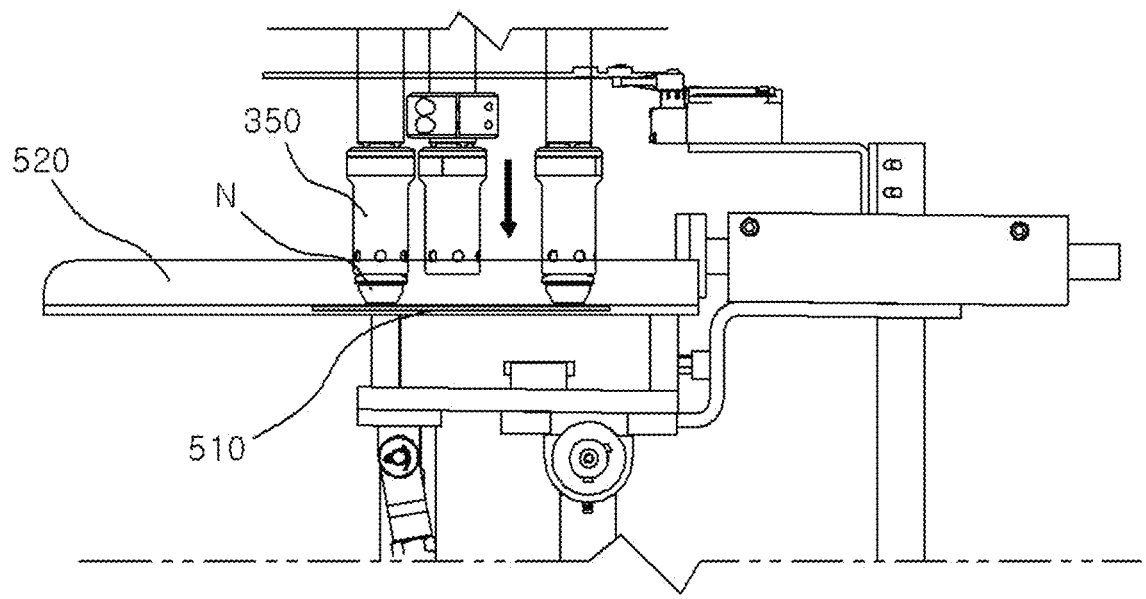
FIG. 20 is a diagram illustrating the state where the pickup fastener approaches the magnetic plate for nut recovery.

In such cases, the pickup fastener 300 moves above the nut recovery unit 500 and descends toward the magnetic plate 510, as illustrated in FIG. 20.

Figure 21:
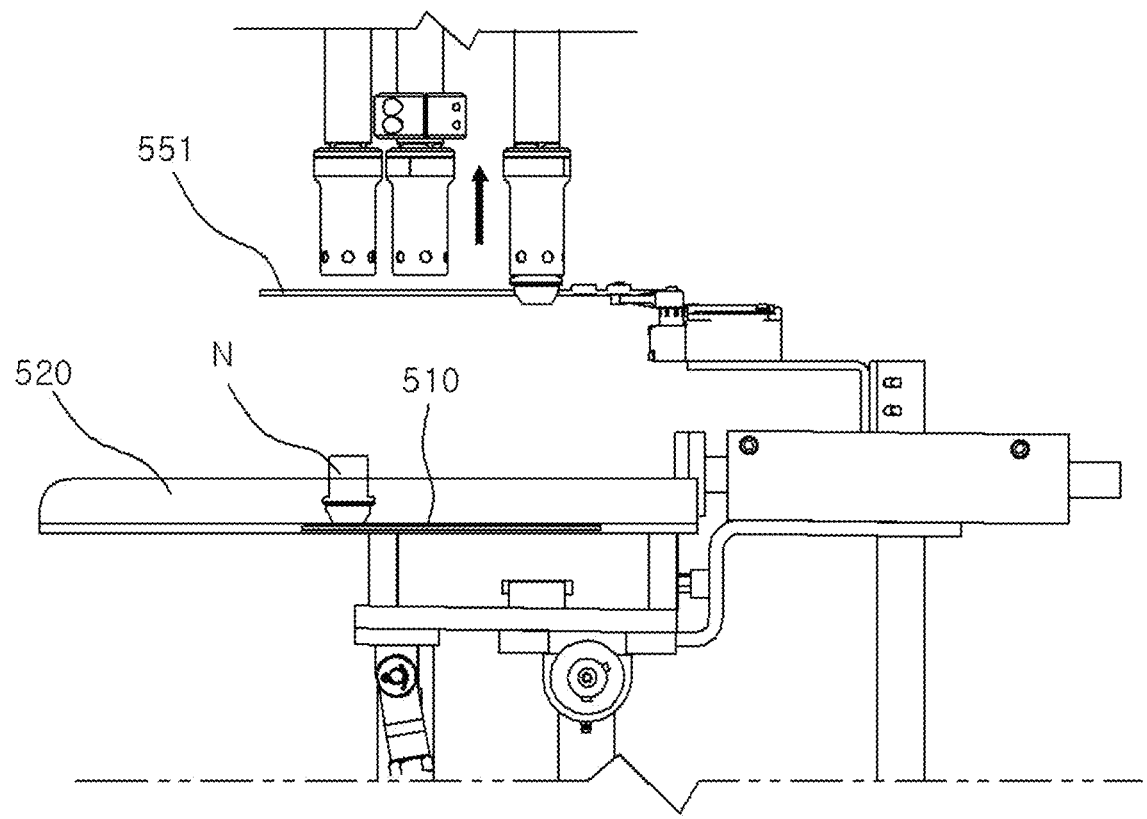
FIG. 21 is a diagram illustrating the state where the nut detaches from the holding socket.

Then, as illustrated in FIG. 21, the nuts N remaining in the holding sockets 350 attach to the magnetic plate 510, and as the pickup fastener 300 moves upward, the nuts N detach from the holding sockets 350 and are automatically recovered.

Figure 22A:
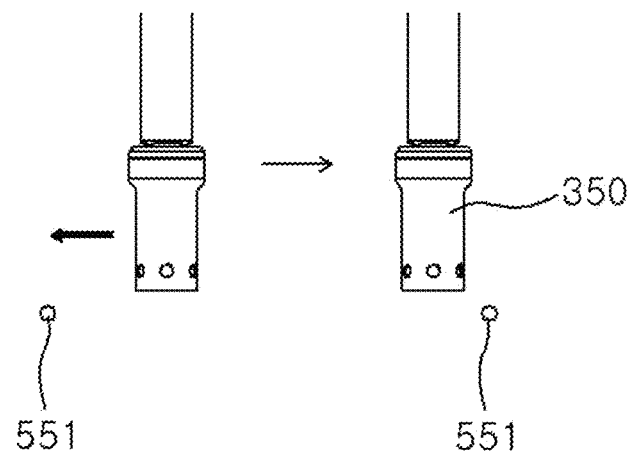
FIGS. 22A and 22B are diagrams illustrating the recovery detection operation by the recovery detector.
Figure 22B:
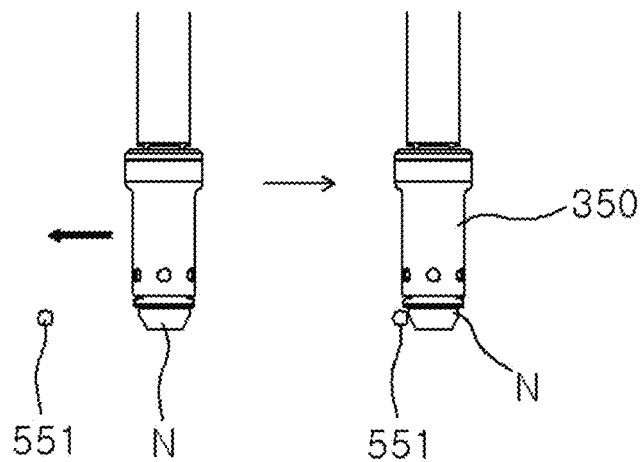

Next, as illustrated in FIGS. 22A and 22B, the pickup fastener 300 moves horizontally, passing over the recovery detector 550 for the recovery detection process.

If the nuts N have been properly recovered, as shown in FIG. 22A, only the holding sockets 350 pass through the detection bar 551 without contact.

However, if the nuts N have not been properly recovered, as shown in FIG. 22B, the remaining nuts N in the holding sockets 350 make contact with the detection bar 551, triggering an abnormal recovery detection signal.

Figure 23:
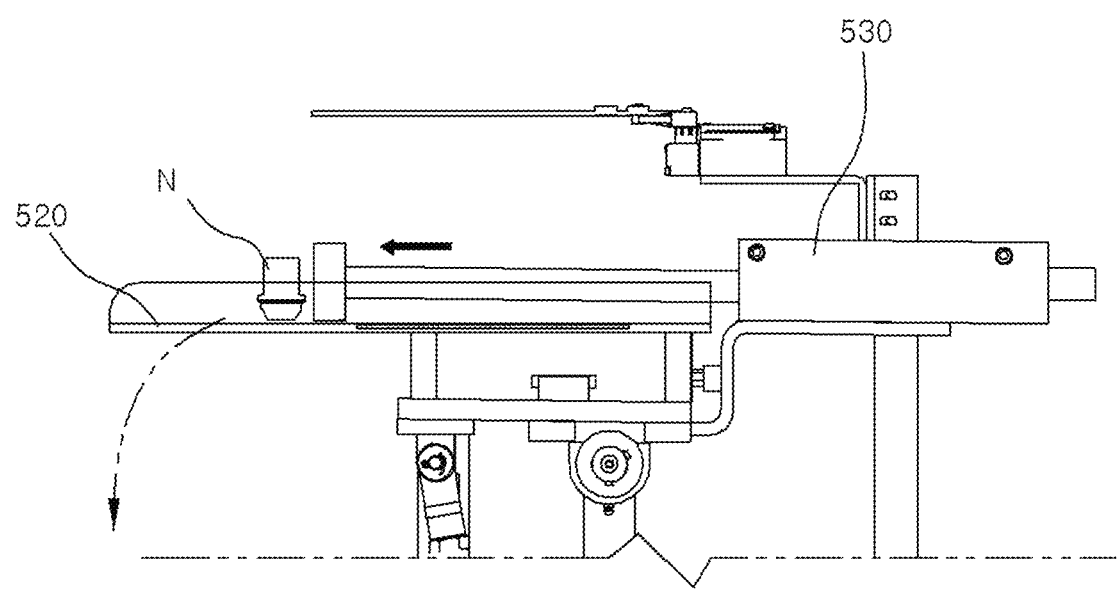
FIG. 23 is a diagram illustrating the nut being pushed and recovered.

If the nuts N have been successfully recovered, as illustrated in FIG. 23, the pushing unit 530 forcibly pushes the nuts N attached to the magnetic plate 510, tilting the rotating panel 520 forward, allowing the nuts N to be finally collected into the collection bin 550, thereby completing the nut recovery process.

The above has been a detailed description of the preferred embodiment of the present invention. However, the technical scope of the present invention is not limited to the embodiments and drawings described above. Modifications or equivalent configurations made by those skilled in the art without departing from the technical spirit of the present invention shall also be considered within the technical scope of the invention.

What is claimed is:

1. A nut pickup and fastening device for automatic tire mounting, comprising:
   a nut setting unit configured to arrange a plurality of nuts to align with a bolt arrangement of a wheel disk provided on a vehicle body; and
   a pickup fastener configured to be coupled to a tip of a robot arm for tire mounting, the pickup fastener comprising:
   a tool frame unit;
   a plurality of nut runners provided on the tool frame unit to correspond to the plurality of nuts and configured to provide torque for nut fastening; and
   a plurality of holding sockets coupled to a tip of each of the plurality of nut runners and configured to pick up and hold the plurality of nuts from the nut setting unit.

2. The nut pickup and fastening device according to claim 1, wherein the nut setting unit comprises:
   a setting die in which a plurality of setting holes are arranged at uniform intervals along a circumferential direction, each setting hole allowing a nut to be inserted and seated; and
   a support provided inside each of the plurality of setting holes to support the seated nut in an upright position.

3. The nut pickup and fastening device according to claim 2, wherein the support is configured to provide frictional force to restrict a rotation of the nut.

4. The nut pickup and fastening device according to claim 3, wherein the support comprises:
   a conical guide head configured to be inserted into an internal threaded portion of the nut; and
   a serrated body formed below the conical guide head, the serrated body configured for providing frictional force to a tightly fitted internal threaded portion by having serrations on its outer surface.

5. The nut pickup and fastening device according to claim 2, wherein the nut setting unit further comprises:
   an insertion pusher positioned to face one of the plurality of setting holes and configured to push and insert the nut into the corresponding setting hole; and
   a shift driver configured to rotate the setting die at a predetermined angle so that the plurality of setting holes shift sequentially in the circumferential direction and face the insertion pusher one by one.

6. The nut pickup and fastening device according to claim 1, wherein the holding socket comprises:
   a female polygonal portion into which a male polygonal portion of the nut is inserted;
   each face of the female polygonal portion including a pressing linear section at a front end that closely contacts the corresponding face of the male polygonal portion based on a torque application direction of the nut runner, and a non-pressing groove section at the rear end that is recessed to provide clearance from the corresponding face of the male polygonal portion.

7. The nut pickup and fastening device according to claim 6, wherein an upper magnetic body is provided at a top of the female polygonal portion to secure the inserted male polygonal portion of the nut, and the upper magnetic body is elastically supported to adjust its vertical position according to a height of the male polygonal portion.

8. The nut pickup and fastening device according to claim 1, wherein the tool frame unit comprises:
   a mounting frame fixedly coupled to the tip of the robot arm;
   a support frame separated from the mounting frame and configured to accommodate the plurality of nut runners; and
   an avoidance cylinder configured to move the support frame backward relative to the mounting frame when a robot malfunction occurs.

9. The nut pickup and fastening device according to claim 1, further comprising:
   a nut recovery unit configured to detach and retrieve the nuts held in the holding sockets.

10. The nut pickup and fastening device according to claim 9, wherein the nut recovery unit comprises:
   a detachment force provider configured to apply a detachment force to the nut held in the holding socket, wherein the detachment force is greater than a holding force provided by the holding socket; and
   a recovery detector configured to detect whether the nut has been detached from the holding socket.

* * * * *